United States Patent [19]

Waly

[11] 3,884,570
[45] May 20, 1975

[54] READER FOR REFLECTIVE BACKGROUND MICRORECORDS

[75] Inventor: Adnan Waly, Stamford, Conn.

[73] Assignee: Personal Communications, Inc., Stamford, Conn.

[22] Filed: Oct. 23, 1973

[21] Appl. No.: 408,577

Related U.S. Application Data

[62] Division of Ser. No. 214,899, Jan. 3, 1972, abandoned.

[52] U.S. Cl. ............. 353/98; 353/26; 353/27; 353/120; 353/122
[51] Int. Cl. ............. G03b 21/28; G03b 21/11; G03b 23/08
[58] Field of Search ......... 353/98, 99, 122, 120, 27; 96/38.3

[56] References Cited
UNITED STATES PATENTS

| | | | |
|---|---|---|---|
| 2,399,799 | 5/1946 | Guellich | 95/5.7 |
| 3,441,941 | 4/1969 | Bullwinkel | 346/17 |
| 3,567,447 | 3/1971 | Chand | 96/36 |
| 3,768,900 | 10/1973 | McLintic | 353/98 |

FOREIGN PATENTS OR APPLICATIONS

| | | | |
|---|---|---|---|
| 43-10241 | 0000 | Japan | 353/120 |

Primary Examiner—Richard E. Aegerter
Assistant Examiner—A. J. Mirabito

[57] ABSTRACT

A microimage record capable of being exposed in a reader or projector to high-intensity light rays for effective enlargement without injury to the record. The record is constituted by a base film having a light-permeable pattern formed thereon defining the recorded microimage, and a light-reflective background in those areas not preempted by the pattern, whereby the record when exposed to light rays produced by a light source reflects rather than absorbs light rays striking the background, the rays otherwise passing through and thereby illuminating the image pattern. Rays reflected back by the record are returned thereto by a reflector whereby virtually all rays emanating from the source are utilized.

8 Claims, 6 Drawing Figures

PATENTED MAY 20 1975

3,884,570

READER FOR REFLECTIVE BACKGROUND MICRORECORDS

RELATED APPLICATION

This application is a division of the copending application Ser. No. 214,899, filed Jan. 3, 1972, and now abandoned.

BACKGROUND OF THE INVENTION

This invention relates generally to microimage records, and more particularly to positive microimage records having reflective backgrounds, capable of being exposed to a high-intensity light source for effective image enlargement without injury to the microrecords.

In order to conserve storage space and afford a ready means for retrieving information, it is now the practice to photograph documents, records, books and various forms of technical data in a sharply reduced scale on microfilm. Conventionally, a microscale image of each book page or document is recorded on a separate frame on a microfilm strip. To view the recorded data, the strip on a reel or cartridge is inserted in a reader or optical projector and the film is advanced therein to place a selected frame into the optical gate whereby an enlarged and readable image is cast on a screen.

In order to facilitate the filing and handling of microfilm records, it is also known to use so-called aperture cards in which a microfilm frame is secured to a window cut in a record card which may be filed and processed in the manner of a standard IBM data card. The image on an aperture card is viewed in an optical reader adapted to receive the card and to project an enlarged image of the image frame in the window onto a screen.

In recent years, a new technique has been developed to place a group of microfilm images on a single sheet rather than along a film roll. In such sheets, which are known commercially as "microfiches," the microscale images are generally arranged serially along parallel rows, whereby the microimages are distributed in a grid formation on the sheet. A microfiche is useful where one wishes to incorporate on a single reproduceable sheet, interrelated documents or other information pertaining to a particular subject matter. Thus, with a microfilm, one may record all of the pages of a sizeable book on a single sheet. Here too, as in the case of a microfilm strip or an aperture card, the images are viewed by means of an optical projector or reader in which the frame to be viewed is aligned with the optical axis of the projector.

Whether the microimages appear in successive frames on a film reel or on aperture cards or a microfiche, the resultant microrecord requires an optical projector in order to be read. By "microrecord" is meant any record, including an individual slide containing an image of a document in a reduced scale. This microrecord projector, regardless of its particular structure and record-handling mechanism for aligning the image to be viewed with the optical system, will in every instance include a light source to illuminate the selected microimage and lens system for enlarging the illuminated microimage.

The ability of a microrecord to withstand light energy impinging thereon from the projector lamp is the factor which largely determines the magnification obtainable in the reader. Since the reader is viewed in a normally lighted room, the brightness of the magnified image on the reader screen must be at a level at which the data can be read without difficulty. The minimum level for this purpose is usually ten foot lamberts.

Conventional silver halide microfilm, as well as Diazo microrecords, usually have images thereon defined by opaque or black symbols, characters and lines representing intelligence printed on a transparent film background. Alternatively, the background may be opaque, in which event the intelligence image pattern appears in transparent form. In the projector, the microrecord is exposed to light rays which are absorbed by the opaque areas and transmitted by the clear areas of the record to produce an enlarged screen image.

The positive image microrecord arrangement in which the intelligence is light-permeable, is often advantageous from the viewing standpoint in that the magnified intelligence appearing on the screen is then illuminated, whereas the background is dark.

Whatever the degree of magnification/reduction and regardless of whether the microrecord is of the positive or negative type, it will be evident that all light rays which impinge on the record must pass through the transparent regions thereof and be blocked by the opaque regions.

If a microrecord contains an image of a document of 8½ by 11 inches whose scale is reduced by 100, its size on the microrecord will be about 0.085 inch × 0.110 inch (disregarding margins). Should one have a print the size of the original document and then place it on a back-lighted viewing box, one can easily attain a level of illumination suitable for viewing, and a corresponding light lever I.

If now the small scale microrecord is projected in a reader to the same size as the original, i.e., onto a screen 8½ inch × 11 inch, one must pass through this 0.085 inch × 0.110 inch image of the document at least the same amount of light as the total amount that has passed through the full-scale (8½ by 11 inches) print on the viewing box, i.e., a total minimum light level of 10,000 I. (In reality, one needs several times this amount because of losses in lenses, viewers, etc.). In other words, at least the same amount of light energy must pass through the small scale microimage to provide sufficient screen illumination as is required to illuminate the much broader area of the full scale image.

Let us now assume that a 200-watt lamp is being used in a projector and that all radiation in the non-visible range has been filtered out rigorously. In this event, a light load of 20 visible watts will have to flow through the microimage to be projected. Consequently, 20 joules of visible energy is incident each second on the microimage.

Assume for the sake of simplicity that the image is predominantly black, i.e., absorbing. Almost all 20 watts will therefore be absorbed in the film emulsion. (In practice, a density D around two or three is necessary. Practically all of the light will be absorbed in the dark portions of the film).

Twenty watts of power represents approximately 20/4.2 calories per second falling onto the small image with an area 0.085 inch × 0.110 inch = 0.00935 square inch × 6.03 × $10^{-2}$ $cm^2$, with the assumption that the base material has negligible absorption in the visible range (i.e., transparent, non-colored base).

Film base material in commercial use is made generally of cellulose acetate or of polyester. The emulsion usually has a thickness of about 100 microns. We may further assume that the average specific heat of the emulsion is 0.5/0.35 cal gm −1 (a very generous assumption). Therefore, 4.8 total calories per second are absorbed in a volume of $6 \times 10^{-4}$ cm$^3$, representing a water-equivalent of $3 \times 10^{-4}$ gm. If 4.8 calories were pumped into this volume every second and if this volume were kept isolated, its temperature would rise to astronomically destructive values almost instantly.

However, normal convection of the air as well as forced air from a blower, assisted by re-radiation of heat at the actual temperature attained and to a lesser extent by heat conduction, serve in practice to limit the temperature rise of the film and to allow an equilibrium to be reached. This equilibrium condition severely limits the light input into a film image and dictates the practical degree of magnification attainable in a given reader without damaging the microrecord.

In existing microrecord systems, the chioce of the reduction ratio depends on many factors. In practice, the reduction ratio from the original printed page to the stored image, may be as low as 12 and as high as 200. Because it is easier to produce microrecords at low reduction ratios and because readers for such records are less costly, commercially available systems for the most part operate with microrecords having a relatively low reduction ratio. But since the whole purpose of microrecords is to conserve space and to afford a ready means to retrieve information, the low reduction ratios presently in use fail to fully exploit the possibilities inherent in this technique.

With the explosive growth of information, present reduction ratios in microrecord systems are inadequate to cope with the expanding volume of data in need of storage. Though it has become possible with newer types of fine-grain high-resolution emulsions and superior film material, to obtain exceptionally high ratios of reduction to the point where an entire page may be reduced to a pinhead and yet optically magnified to a readable size, the severe limitations imposed on reader magnification by the existing inability of the microrecord to withstand the high-intensity of visible light entailed by such magnification, has heretofore frustrated the practical utilization of high reduction ratio microrecords, particularly in conjunction with low-cost readers.

SUMMARY OF THE INVENTION

In view of the foregoing, it is the main object of this invention to provide a microimage record or microrecord in which the intelligence to be recorded is printed or otherwise applied on a film base in the form of a light-permeable pattern, the remaining area of the record being in the form of an opaque, reflective background, whereby light rays impinging on the record pass through the pattern to create an illuminated image and are reflected rather than absorbed by the background, thereby minimizing the amount of heat generated in the record.

Also an object of the invention is to provide low-cost and efficient techniques for manufacturing reflective background microrecords in accordance with the invention.

One significant advantage of the invention is that it makes possible much higher practical reduction ratios for microrecords, for even very sharply reduced images may be illuminated and enlarged without generating excessive heat that otherwise might be destructive of the record or result in shortening its life. Another important advantage of the invention is that it becomes possible to obtain much brighter-illuminated magnified images on a reader screen using light sources of relatively lower intensity compared to the intensity now required to achieve the same level of screen illumination.

In applicant's arrangement, all rays emanating from the source ultimately pass through the permeable image pattern, for those rays which are reflected by the record are gathered by the source reflector and returned to the record, save for losses resulting from imperfect reflection.

Briefly stated, these objects are attained in a microrecord formed by a transparent film base having a thin layer of highly-reflective material thereon, which layer is rendered selectively light-permeable by an image pattern constituted by letters and other forms of intelligence.

OUTLINE OF THE DRAWINGS

For a better understanding of the invention, as well as other objects and further features thereof, reference is made to the following detailed description to be read in conjunction with the accompanying drawings, wherein.

DESCRIPTION OF THE INVENTION

Figure 1:
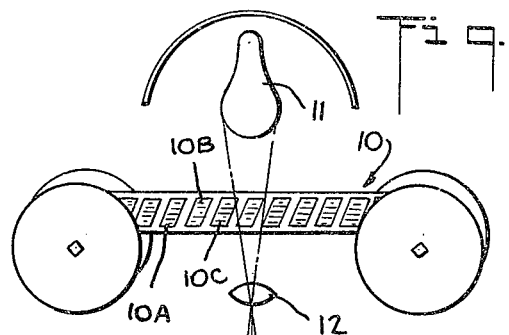
FIG. 1 shows schematically an optical reader for a microrecord in transparent film strip form.
Figure 2:
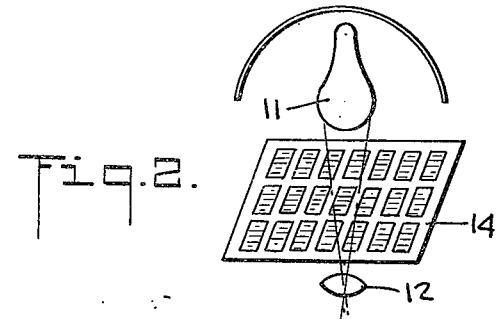
FIG. 2 illustrates schematically an optical reader for a microrecord in transparent microfiche form.

Referring now to FIG. 1, there is shown schematically the basic optical system employed for reading a microimage record on a microfilm strip 10 of the reel-to-reel or film cartridge type. Appearing on the microfilm strip is a series of microimage frames 10A, 10B, 10C, etc., each being in the form of a reduced image of the original document. The frame to be viewed in the projector is aligned by the film transport mechanism in a film gate with the optical axis X, and is illuminated by a light source 11. The illuminated image is enlarged by an optical system 12 and projected onto a screen to provide an enlarged and readable image 13.

Where the record is in the form of a microfiche 14, as shown in FIG. 2, the microfiche contains an array of image frames and is positioned by a sitable X-Y transport mechanism adapted to align a selected frame with the optical axis X to project an enlarged image thereof on the screen.

In conventional arrangements of the type shown in FIGS. 1 and 2, the record is in the form of a transparency in which the background is black, and the letters, characters, or other symbols forming the recorded intelligence are clear or light-permeable. Hence when the record is subjected to light radiation fluxes, the black background area will absorb most of the incident energy, and heat will be generated. As previously explained, this makes it dangerous to use a high-intensity light source for obtaining a high order of magnification. Existing microrecord systems are therefore limited to records having a fairly low magnification ratio, for otherwise it is not possible to magnify and illuminate the record to the extent necessary for acceptable viewing of the recorded images.

Figure 3:
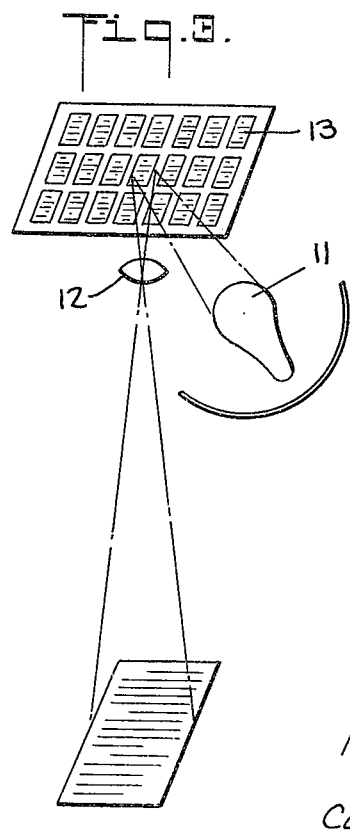
FIG. 3 illustrates schematically a reader for an opaque microfiche.

The same problem exists with opaque microrecords such as the microfiche 15 shown in FIG. 3, in which the letters or other elements forming the image pattern are printed in white, and the background in black, the light incident to the record being reflected by the white image pattern and magnified optically to produce a readable image, the black background absorbing light and generating internal heat.

Figure 4:
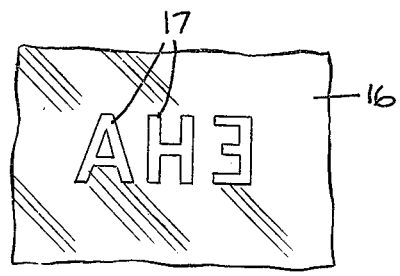
FIG. 4 is a piece of microrecord in accordance with the invention.

In a microrecord in accordance with the invention, as shown in FIG. 4, the entire surface 16 of the record facing the light source is highly reflective or specular in form, whereas the letters 17, characters, symbols, lines, etc., which constitute the recorded intelligence, are light-permeable. Thus, the light rays pass through the recorded patterns of intelligence and are reflected by the reflective background without light absorption, thereby producing an enlarged pattern on the screen. Assuming an ideal reflector and a totally permeable image pattern, no heat whatever would be generated.

Accepting the fact that in practice, particularly with low-cost materials, some degree of absorption will be experienced, a reflective-background microrecord in accordance with the invention still makes possible much higher orders of reduction and magnification or illumination, particularly if the film material also has an inherent high resolution. Even with conventional cooling methods, one may use microrecords with high reduction ratios and thereby enhance the storage possibilities of the system.

With a highly reflective-background microrecord, new qualitative and quantitative effects are achievable. For example, in any normal textbook, the area of the background is vastly larger than the printed portion (in which the intelligence is concentrated); that is to say, the ratio of background to printed matter is at least twenty to one. Let us assume that the microrecord covers the aperture of a reflecting spherical cavity containing the light source, and let us consider that the intelligence is represented by a small hole in the shape of a letter, then in this example, all the light emitted by the source and not absorbed would eventually, by way of multiple reflection, pass through the shaped hole in the reflecting microrecord.

Therefore, the image in this example would be twenty times as bright as with an absorbing microrecord, or conversely, for the same brightness one would need a lamp with 5 percent of the usual power required. This example represents, of course, an unattainable "ideal" condition, but with reflectivities of any practical value, the conditions are far better than with the standard light-absorbing microrecord. Reflectivities of aluminum on Mylar, for instance, exceeding a value of 95 percent, can be readily attained.

In any event, such reflectivities allow cooler operation of a microrecord even without a special cooling fan. In one test, a normal silver halide film of D>2 was exposed through a window 5 × 3.86 cm² illuminated with an ellipsoidal ORSAM lamp, 8 volt, 50-watt, and as tested with a flute of Tempelsticks, attained after reaching equilibrium, a temperature larger than 200° F.

On the other hand, a reflective Mylar film in accordance with the invention, coated with aluminum, never even reaches 130° F., a value allowable even for a cellulose acetate base. Measurements with a digital thermistor thermometer confirmed these results in every instance.

Mylar or other plastic films are readily coated with reflecting aluminum or other metals such as silver or tin. The thickness of the layer can be chosen such that any optical density desired for contrast is achieved. Layers of a few (one or two) wave-lengths thickness, lead to high optical density.

Figure 5:
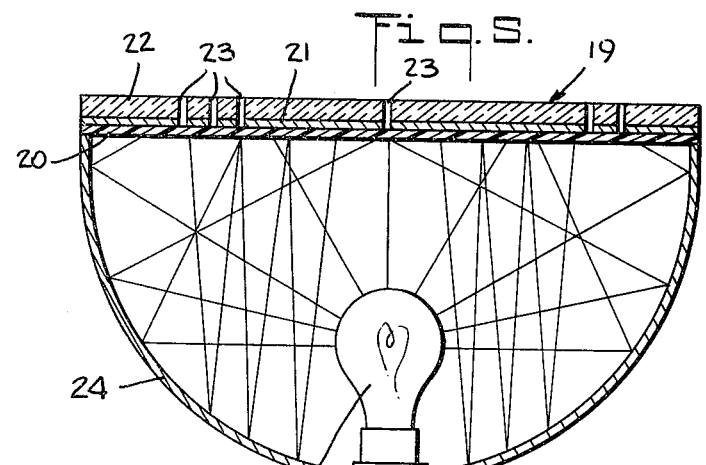
FIG. 5 illustrates, in section, a reflective-background microrecord according to the invention, in combination with a reflective light source, all of whose light ultimately passes through the record.

Referring now to FIG. 5, a reader arrangement is illustrated, in which virtually all light from a lamp 18 passes through a microrecord in accordance with the invention. The microrecord generally designated by numeral 19, is constituted by a transparent base film 20 of, say, Mylar, having a reflective layer 21 formed thereon, say of aluminum, which layer is covered by an emulsion 22 which has been developed to provide an image pattern formed by light-permeable areas.

The record is processed so that the light-permeable areas represented by openings 23 penetrate the aluminum layer. Hence, light may be transmitted through the record only through the transparent base 20 and the openings 23, all other areas of the record being highly reflective.

The microrecord 19 is placed over the opening of a concave reflector 24 for light source 18. The contour of the reflector is such that all light reflected back by the micro-record is again reflected to produce multiple paths ultimately leading to an opening in the microrecord. As a consequence, virtually no light is lost or absorbed, and full use is made of the available light energy.

Figure 6:
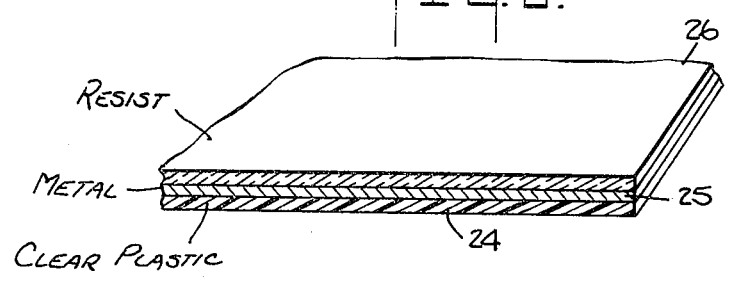
FIG. 6 is a sectional view of a microrecord blank in accordance with the invention.

We shall now describe various techniques for manufacturing a microrecord in accordance with the invention. One technique by which intelligence can be recorded, is as follows:

A Mylar film 24, as shown in FIG. 6, is coated with a layer 25 of aluminum in a vacuum-type evaporator, in the manner disclosed, for example, in Scharf U.S. Pat. No. 3,311,486.

The aluminum side of this film is subsequently coated with a photo-reactive "resist" 26. One type of resist suitable for this purpose is a plastic monomer which will polymerize when exposed through a "negative" (representing the photgraphic intelligence to be printed). With the necessary dose of ultra-violet light, photo polymerization takes place in those regions where the light strikes the monomer. This transforms the illuminated portion from a soluble monomer to an insoluble polymer (for a given monomer-polymer solvent system).

After exposure, the film-aluminum-resist sandwich can be placed in the solvent mentioned above, and all may be readily dissolved. After removing the solvent by drying in an oven or in the air, the sandwich is then placed in a chemical solution capable of dissolving aluminum without affecting the polymer formed. Many such solutions are available commercially.

The polymer formed previously is now a coating on the aluminum and functions as a protective layer against scratches and abrasions. (For special applications, even this polymer can be removed and the complete aluminum side laminated with a thin protective layer).

In case one desires to have zero or low reflectively on the side of the microrecord facing the lens, for instance, the Mylar can first be coated with an absorbing substance, e.g., a dye, or with a substance transforming into a light-absorbing substance the layer of aluminum in contact with it.

Another technique for making a microrecord can also begin by coating a Mylar or other plastic film with a thin layer of resist. The resist layer is then exposed through a "photographic negative" to ultra-violet light, and the portions exposed are polymerized as above described and thereby rendered insoluble. Susequently, the exposed monomer is removed with the help of a monomer solvent which does not affect the polymer formed.

The next step is to evaporate aluminum over the whole sheet on the side of the selectively polymerized resist. That portion of the Mylar base material where the monomer has been removed, will then be coated with aluminum as well as the polymer. Now the polymer can be dissolved away and take with it its aluminum coating, leaving the aluminum only where there were originally those portions not reached by ultraviolet light on exposure through the negative.

Many other processes can be used to "print" out an image in metal or other reflecting material with the help of such "resist" techniques. The converse can be used also. Where the light strikes the medium, the material can be depolymerized and becomes soluble. Subsequent steps can follow, arranged in a logical sequence as described above.

In principle and also in practice, one can use any reflecting material other than a metal to obtain "reflection." Some oxides such as zinc oxide, titanium oxide, magnesium oxide, etc. have excellent reflecting properties. Their reflectivities can be very high but are not specular as in the case with thin metallic layers.

A totally different group of reflecting substances which can be used with the lowest absorption factors are thin layers of dielectrics applied in proper sequence and proper thickness. Such alternating layers of zinc sulfide in some instances alternating with magnesium fluoride in $\tau/2$ thickness can yield mirrors with incredible reflectivities in excess of 99.8%. These have been used with some types of laser. Their quality and mode of application will depend upon the result sought.

Still another way of coating a microrecord with a reflecting layer is by chemical depositions of metals. One effective method is to coat the Mylar or other base film with tin oxide by immersion in the tin chloride solutions. If subsequently selectively exposed to ultra-violet light or other activating radiation through the photographic negative, immersion of the exposed Mylar-tin oxide system, for example, into a solution of palladium chloride will deposit a thin layer of palladium wherever the tin oxide layer was not exposed to the radiation. The radiation destroys the capacity of the tin oxide to reduce the palladium ions to palladium metal. Electroplating or any fast chemical deposition process can follow.

The resolution of such a system (aluminum evaporated on the Mylar under the resist or above the resist), is excellent and allows diffractive limited spacings and lines in the negative, i.e., it matches in capability any of the absorbing molecular systems such as the Diazo material, etc.

A combination of a coupled diazo compound with aluminum on Mylar or other base, allows the processing and subsequent etching used in Kalle or Azoplate printing plates.

While there has been shown and described a preferred embodiment of reflective-background microrecords in accordance with the invention, it will be appreciated that many changes and modifications may be made therein without, however, departing from the essential spirit of the invention.

I claim:

1. A reader for a microrecord constituted by a base of transparent film material having a layer of highly reflective material thereon forming an image background and a microimage intelligence pattern on said base defined by shaped-light permeable openings in the reflective layer, said reader comprising:
   A. a viewing screen,
   B. a light source producing light rays which are radiated toward the reflective layer on said microrecord and pass through said openings to present said intelligence pattern on said screen, the rays impinging on said reflective layer being reflected back, and
   C. reflective means contoured to collect and reflect said reflected-back rays and to return them toward said microrecord to cause substantially all rays emanating from said source to ultimately pass through the light-permeable openings in the microrecord whereby the light available from said source is fully exploited, said reflective means being constituted by a concave reflector whose mouth is fully covered by said microrecord.

2. A reader as set forth in claim 1, wherein said microrecord base is formed of Mylar.

3. A reader as set forth in claim 1, wherein said microrecord base is formed of cellulose acetate.

4. A reader as set forth in claim 1, wherein said reflective layer on said microrecord is formed of aluminum.

5. A reader as set forth in claim 1, wherein said reflective layer on said microrecord is formed of silver.

6. A reader as set forth in claim 1, wherein said reflective layer on said microrecord is formed by a reflective metal oxide.

7. A reader as set forth in claim 1, wherein said reflective layer on said microrecord is formed by a dielectric material.

8. A reader for a microrecord capable of being brightly illuminated and comprising a base of transparent film material having a layer of highly reflective material thereon forming an image background, said layer having a reflectivity of at least about ninety-five percent, and a microimage intelligence pattern on said base in a reduction ratio of at least one hundred, said pattern being defined by shaped, light-permeable openings in the reflective layer, the area ratio of said reflective background to said light-permeable pattern being at least twenty-to-one, said reader including a light source disposed in a concave reflector whose mouth is fully covered by the record, whereby light returned to said reflector by the reflective layer is directed back to said openings and virtually all light from said source passes through the light-permeable openings in the record.

* * * * *

UNITED STATES PATENT OFFICE
CERTIFICATE OF CORRECTION

PATENT NO. : 3,884,570
DATED : May 20, 1975
INVENTOR(S) : Adnan Waly

It is certified that error appears in the above-identified patent and that said Letters Patent are hereby corrected as shown below:

Column 2, line 62 "inch X" should have read -- inch = --

Column 3, line 9 "convention" should have read

-- convection --

Column 4, line 56 "sitable" should have read -- suitable --

Signed and Sealed this twenty-second Day of July 1975

[SEAL]

Attest:

RUTH C. MASON
Attesting Officer

C. MARSHALL DANN
Commissioner of Patents and Trademarks